United States Patent [19]

Shiraishi

[11] Patent Number: 4,785,626

[45] Date of Patent: Nov. 22, 1988

[54] EXHAUST GAS CONTROL MEANS FOR MOTORCYCLE AND THE LIKE

[75] Inventor: Shinji Shiraishi, Iwata, Japan

[73] Assignee: Yamaha Hatsudoki Kabushiki Kaisha, Iwata, Japan

[21] Appl. No.: 113,539

[22] Filed: Oct. 26, 1987

[30] Foreign Application Priority Data

Oct. 27, 1986 [JP] Japan ............................. 61-253640
Oct. 27, 1986 [JP] Japan ............................. 61-253641
Oct. 27, 1986 [JP] Japan ............................. 61-253642

[51] Int. Cl.⁴ ........................................... F02B 27/02
[52] U.S. Cl. ............................. 60/313; 60/323; 60/324; 137/595; 180/219; 180/296; 180/309
[58] Field of Search ............... 60/313, 323, 324; 180/296, 309, 219; 137/595

[56] References Cited

U.S. PATENT DOCUMENTS

| | | |
|---|---|---|
| 933,906 | 9/1909 | Illy . |
| 1,411,226 | 3/1922 | Stumpf . |
| 2,230,740 | 2/1941 | Birkigt . |
| 2,239,262 | 4/1941 | Violet . |
| 2,305,946 | 12/1942 | Wilson et al. . |
| 2,627,851 | 2/1953 | Cushman . |
| 2,644,436 | 7/1953 | Berlyn . |
| 2,686,398 | 8/1954 | Anderson . |
| 2,727,583 | 9/1955 | Maybach et al. . |
| 3,523,418 | 8/1970 | Marsee . |
| 3,751,921 | 8/1973 | Blomberg et al. . |
| 3,817,227 | 6/1974 | Onishi . |
| 3,938,330 | 2/1976 | Nakajima et al. . |
| 3,969,895 | 7/1976 | Krizman . |
| 4,051,821 | 10/1977 | Amann . |
| 4,254,752 | 3/1981 | Friddell et al. . |
| 4,427,087 | 1/1984 | Inoue ..................... 180/219 |
| 4,522,029 | 6/1985 | Tomita et al. . |
| 4,539,813 | 9/1985 | Tomita et al. . |
| 4,545,200 | 10/1985 | Oike et al. . |
| 4,554,785 | 11/1985 | Oike . |
| 4,558,566 | 12/1985 | Shirakura . |

FOREIGN PATENT DOCUMENTS

| | | | |
|---|---|---|---|
| 54118 | 5/1976 | Japan . | |
| 186013 | 11/1982 | Japan ..................... | 60/313 |
| 158311 | 9/1983 | Japan ..................... | 60/313 |
| 132018 | 7/1985 | Japan ..................... | 60/313 |
| 231156 | 9/1926 | United Kingdom . | |
| 262044 | 2/1928 | United Kingdom . | |
| 519806 | 4/1940 | United Kingdom . | |
| 542429 | 1/1942 | United Kingdom . | |
| 561932 | 1/1944 | United Kingdom . | |
| 572724 | 10/1945 | United Kingdom . | |

Primary Examiner—Douglas Hart
Attorney, Agent, or Firm—Ernest A. Beutler

[57] ABSTRACT

A number of embodiments of motorcycle exhaust systems including control valves for controlling the effective area of the exhaust pipes and for improving performance by preventing reflections from one exhaust pipe back into the cylinder served by another exhaust pipe. The valve means lies under the engine crankcase and the crankcase is formed with a recess for clearing the valve means and permitting air flow across it for cooling purposes. Various valving arrangements are disclosed as is a skid plate arrangement for protecting the valve means.

30 Claims, 8 Drawing Sheets

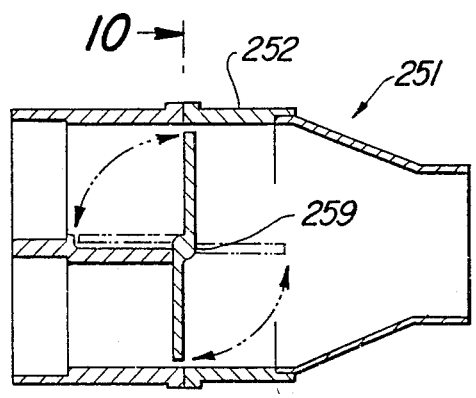
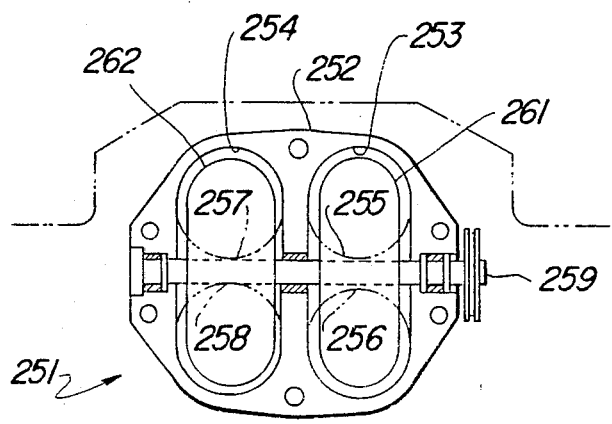

EXHAUST GAS CONTROL MEANS FOR MOTORCYCLE AND THE LIKE

BACKGROUND OF THE INVENTION

This invention relates to an exhaust gas control means, and more particularly, to an exhaust gas control means for vehicles such as motorcycles.

It is well known that the design of the exhaust system for an internal combustion engine can significantly affect the engine performance. With multiple cylinder engines, it is a practice to employ individual exhaust pipes that extend from the individual exhaust ports of the engine and which merge into a common expansion or collector chamber for improving top end performance. Although the use of an expansion or collector chamber for this purpose is effective increasing maximum output of the engine, it has been found that the chamber can contribute to poor running under other than maximum speed conditions. This is a result of the reflection of the exhaust gas pulses from one cylinder back to another cylinder during these running conditions. These pulsations transferred back into the exhaust parts of another cylinder tend to reduce the breathing ability of the engine at lower running speeds and, as noted, adversely affects the output of the engine.

In order to improve the efficiency of the engine and its output at all running conditions, it has been proposed to incorporate a reflective valve means in the individual exhaust pipes upstream of the expansion or collector chamber. Such an arrangement is shown in the co-pending applications entitled "High Performance Exhaust System for Internal Combustion Engine", by Hideaki Ueda, Ser. No. 935,340, filed Nov. 26, 1986, and "High Performance Exhaust System For Internal Combustion Engine", by Hideaki Ueda, Ser. No. 935,342, filed Nov. 26, 1986, and assigned to the assignee of this application.

Although the systems disclosed in those applications are particularly effective in improving the performance throughout the entire engine and loads ranges, the positioning of the valves in the exhaust pipe is important to the effectiveness of the system and frequently the valves must be positioned directly underneath the engine. In such an arrangement, this can cause difficulty with certain types of vehicles, particularly compact vehicles such as motorcycles. Specifically, where the engine exhaust pipes pass beneath the crankcase transmission of the vehicle, they can seriously reduce the ground clearance and/or may be positioned so that they interfere with leaning of the machine when cornering.

It is, therefore, a principal object of this invention to provide an improved and compact exhaust gas control arrangement for vehicles.

It is a further object of this invention to provide an improved and compact motorcycle arrangement having an exhaust gas control arrangement.

In connection with the use of such exhaust control valves, it is obvious that heat can be a significant problem. In order to provide a valve that is effective, it is desirable to minimize the amount of heat which is exerted on the valve so as to ensure long life and good operation.

It is, therefore, a further object of this invention to provide an improved arrangement for exhaust gas control wherein the control means is effectively cooled.

It is a further object of the invention to provide an exhaust gas control arrangement for a motorcycle wherein the control valve will be adequately cooled.

In connection with the use of control valves for multiple cylinder engines, it is desirable to maintain the valve shafts as short as possible so as to minimize the effect of thermal expansion. One way this can be done is by having the exhaust pipes and the individual valves positioned vertically above each other. However, such a configuration can further aggravate the ground clearance problems already noted.

It is, therefore, a still further object of this invention to provide an exhaust gas control valve arrangement which will permit a compact configuration and, at the same time, minimize the effects of thermal expansion.

It is another object of the invention to provide a compact multiple valve element control valve for an engine exhaust system.

In connection with vehicles wherein the control valve is positioned at a low point in the vehicle, it is essential to ensure that the valve will not be struck by obstacles when the vehicle is in motion. If the valve becomes struck, there is a danger that it may be damaged and/or locked in a position which will not result in good performance under all running conditions.

It is, therefore, still a further object of this invention to provide an improved and protected exhaust gas control means for a vehicle.

SUMMARY OF THE INVENTION

A first feature of the invention is adapted to be embodied in an internal combustion engine that is comprised of a crankcase defined by a crankcase housing. The engine has a plurality of exhaust ports that are formed in a side of the engine and a plurality of exhaust pipes extend from the exhaust ports downwardly and pass beneath the crankcase housing. Valve means are provided in the exhaust pipes for controlling the flow therethrough. This valve means lies beneath the crankcase housing and in accordance with this feature of the invention, a recess is formed in the crankcase housing through which at least a portion of the valve means and exhaust pipes pass.

Another feature of this invention is adapted to be embodied in a control valve arrangement for an exhaust system of an internal combustion engine of the type described in the preceding paragraph. In accordance with this feature of the invention, the valve means is comprised of an outer housing having at least an upper and a lower vertically spaced exhaust passage in which a valve element is positioned. The valve elements are supported upon respective rotatably supported valve shafts. In accordance with this feature of the invention, a control device rotatably positions the lowermost valve shaft and a motion transmitting means transmits motion from the lowermost shaft to the uppermost shaft so that the valves will be operated in unison.

Yet a further feature of the invention is adapted to be embodied in a vehicle having an internal combustion engine with a plurality of exhaust ports from which exhaust pipes extend downwardly and pass beneath the engine. Valve means are provided in the exhaust pipes for controlling the flow therethrough and a skid plate is positioned beneath the valve means for protecting the valve means.

BRIEF DESCRIPTION OF THE DRAWINGS

FIG. 9 is a cross-sectional view, in part, similar to FIGS. 5 and 7, showing a control valve constructed in accordance with yet another embodiment of the invention.

FIG. 10 is a cross-sectional view taken along the line 10—10 of FIG. 9.

DETAILED DESCRIPTION OF THE PREFERRED EMBODIMENTS

Figure 1:
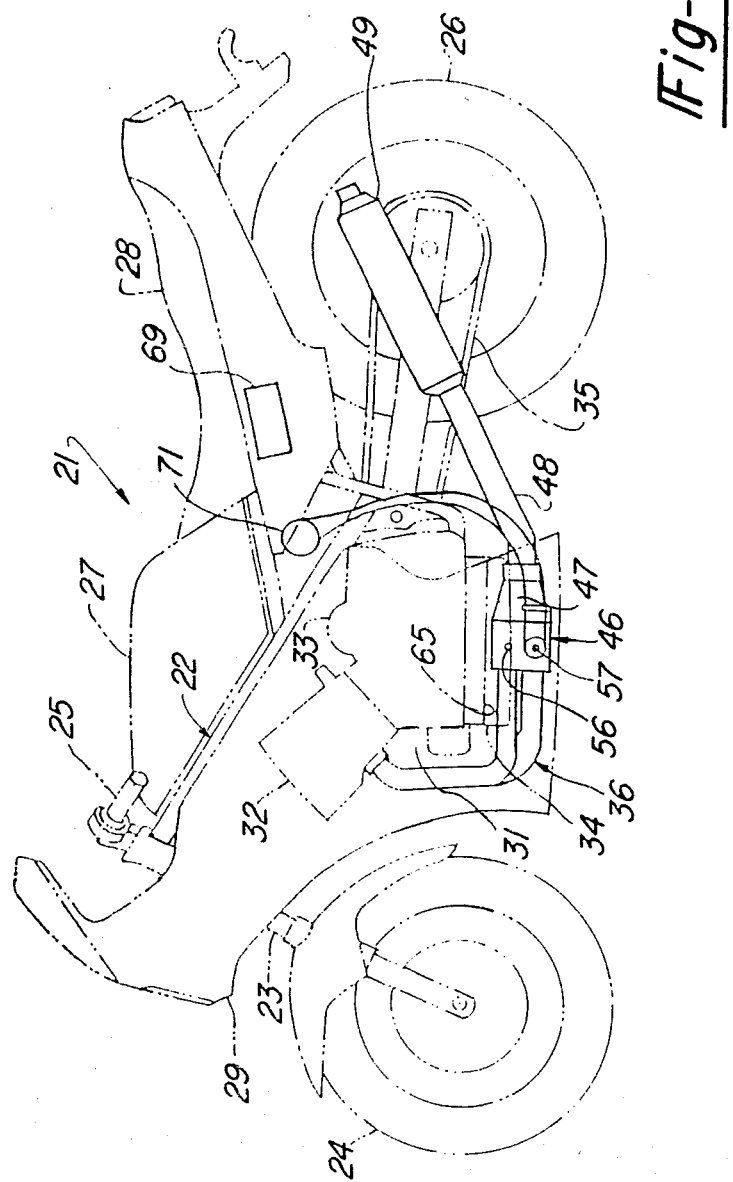
FIG. 1 is a side-elevational view of a motorcycle having an exhaust system constructed in accordance with an embodiment of the invention. The exhaust system is shown in solid lines whereas the remainder of the motorcycle is shown in phantom.

Referring first to FIG. 1, a motorcycle constructed in accordance with a first embodiment of the invention is identified generally by the reference numeral 21 and is shown primarily in phantom. Although the invention has utility with other types of vehicles or other applications for internal combustion engines, it has particular utility in connection with a motorcycle.

The motorcycle 21 is comprised of a frame assembly 22 that journals a front fork assembly 23 for steering movement. A front wheel 24 is supported by the fork assembly 23 and may be steered by means of a handle bar 25. The motorcycle frame 22 further mounts a driven rear wheel 26, which is driven in a manner to be described. A fuel tank 27 is carried by the frame assembly 22 rearwardly of the handle bar 25 and front fork 23. A seat 28 is supported on the frame 22 rearwardly of the fuel tank 27 so as to accommodate a rider. A cowling assembly, or body, 29 is also carried over the frame assembly 22 for affording streamlining and wind protection.

The motorcycle 21 is powered by an internal combustion engine, indicated generally by the reference numeral 31. The engine 31 is suspended in the frame assembly 22 in a known manner and is provided with a cylinder block 32 which is disposed so that the cylinder bores are transversely disposed relative to the longitudinal axis of the motorcycle 21. The engine 31 further includes a combined crankcase transmission assembly 33 which is formed at least in part by a lower crankcase housing 34. The transmission crankcase assembly 33 includes a change speed transmission that drives the rear wheel 26 via a chain 35 in a known manner.

Figure 2:
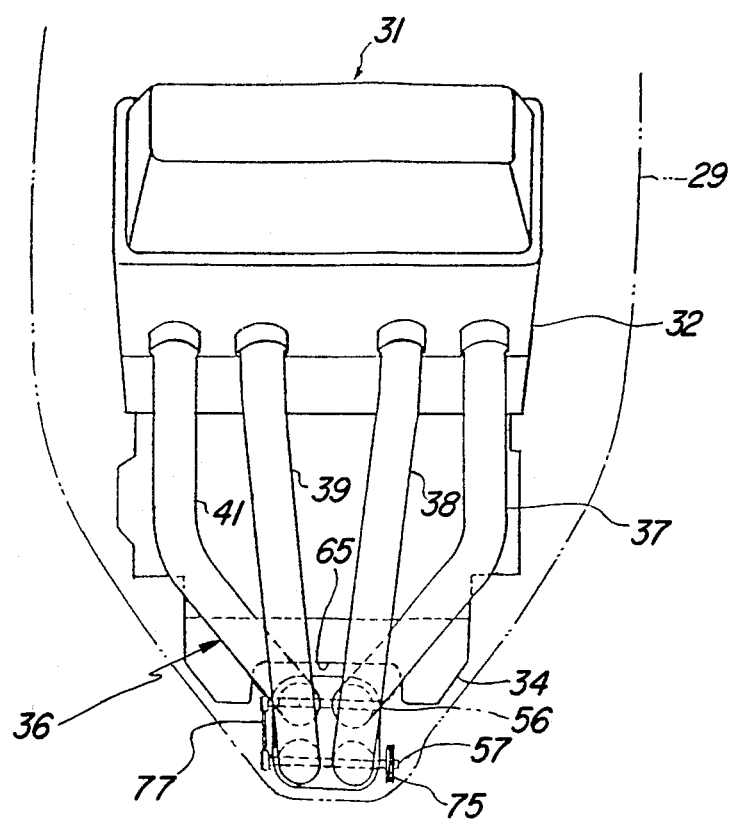
FIG. 2 is an enlarged front elevational view showing the engine and the exhaust system.

The engine 31 is further provided with an exhaust system, indicated generally by the reference numeral 36 and constructed in accordance with an embodiment of the invention. The exhaust system 36 is best understood by reference to FIGS. 2 through 4. As has been noted, the cylinder block 32 is disposed so that the cylinder bores extend transversely across the motorcycle 21. The cylinder block, or cylinder head, are formed with exhaust ports that pen forwardly and downwardly. In the illustrated embodiment, there are four such exhaust ports and individual exhaust pipes 37, 38, 39 and 41 have respective flanged end portions 42, 43, 44 and 45 that are matingly engaged with and affixed to the exhaust ports in a known manner. The exhaust pipes 37, 38, 39 and 41 extend downwardly and then turn rearwardly and run in a generally horizontal plane beneath the engine 31. Specifically, the exhaust pipes 37, 38, 39 and 41 extend under the crankcase housing 34. For a reason to be described, the exhaust pipes are paired so that the pipes 37 and 41 lie above the pipes 38 and 39 respectively.

In the area under the crankcase member 34, there is provided a control valve assembly indicated generally by the reference numeral 46. The control valve assembly 46 includes a collector, expansion section 47 from which a tail pipe 48 extends. A muffler 49 is positioned at the end of the tail pipe 48 and discharges the silenced gases to the atmosphere in the area adjacent the rear wheel 26 at one side thereof.

Figure 5:
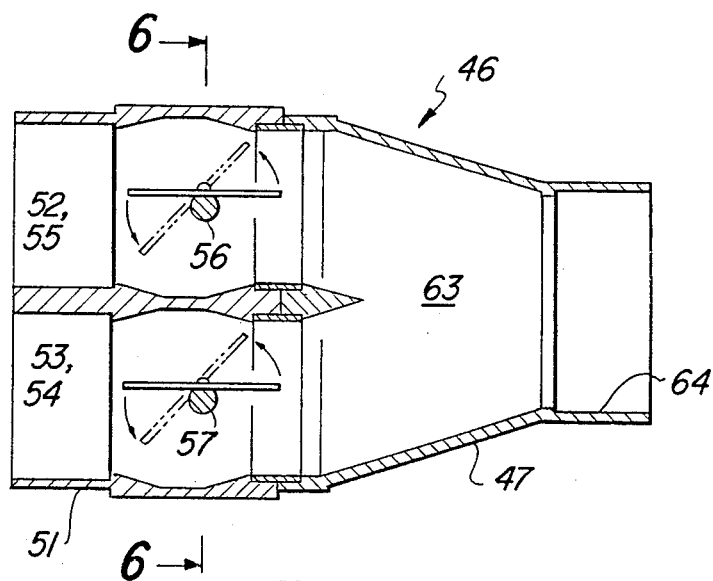
FIG. 5 is an enlarged longitudinal cross-sectional view showing the control valve.
Figure 6:
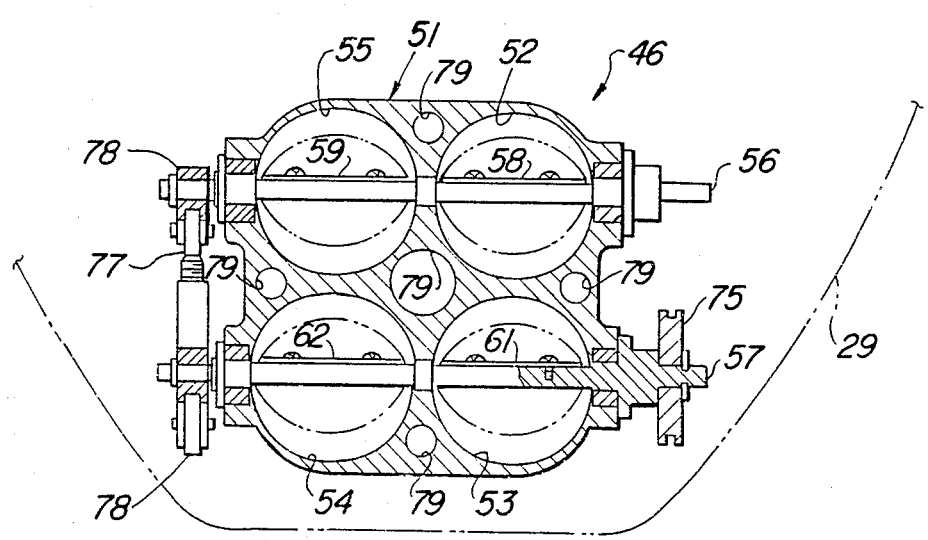
FIG. 6 is a cross-sectional view taken along the line 6—6 of FIG. 5.

Referring now primarily to FIGS. 5 and 6, the construction of the valve assembly 46 will be described. The valve assembly 46 includes a main housing assembly 51 that is formed with four cylindrical inlet sections 52, 53, 54 and 55, that receive the rearward ends of the exhaust pipes 37, 38, 39 and 41, respectively. Cylindrical sections 52 through 55, therefore, form the exhaust gas inlets to the valve body 51. Downstream of the inlet portions, there are provided pairs of upper and lower enlarged openings through which an upper valve shaft 56 and a lower valve shaft 57 extend. Valve plates 58 and 59 are affixed to the valve shaft 56 within the openings that are aligned with the inlet openings 52 and 53. In a like manner, valve plates 61 and 62 are fixed to the valve shaft 57 in the openings which are aligned with the inlet openings 53 and 54. The valve plates 58, 59, 61 and 62 are disposed so that when they are in their fully closed position, as shown in the phantom line view of FIGS. 5 and 6, they will obstruct approximately one-half of the flow area through the respective passages. When in their fully opened position, the valve plates 58, 59, 61 and 62 will offer substantially no restriction to flow.

Downstream of the valve plates 58, 59, 61 and 62, the expansion section 47 forms a collector volume 63 that functions as an expansion chamber. A cylindrical opening 64 is formed at the trailing end of the valve housing 51 and receives the inlet end of the tail pipe 48.

Figure 3:
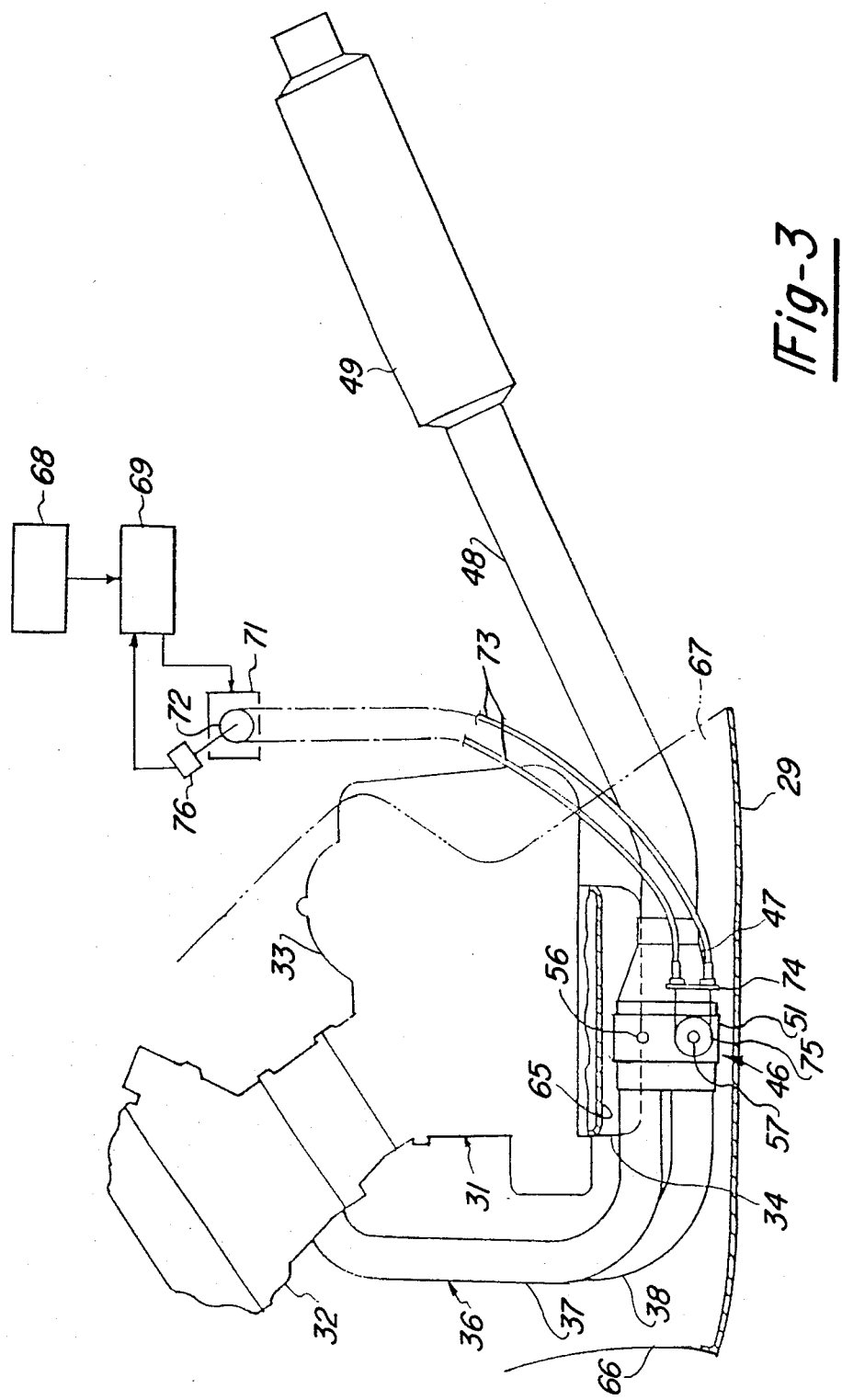
FIG. 3 is an enlarged side-elevational view showing the engine, exhaust system and a portion of the motorcycle, which is partially broken away.
Figure 4:
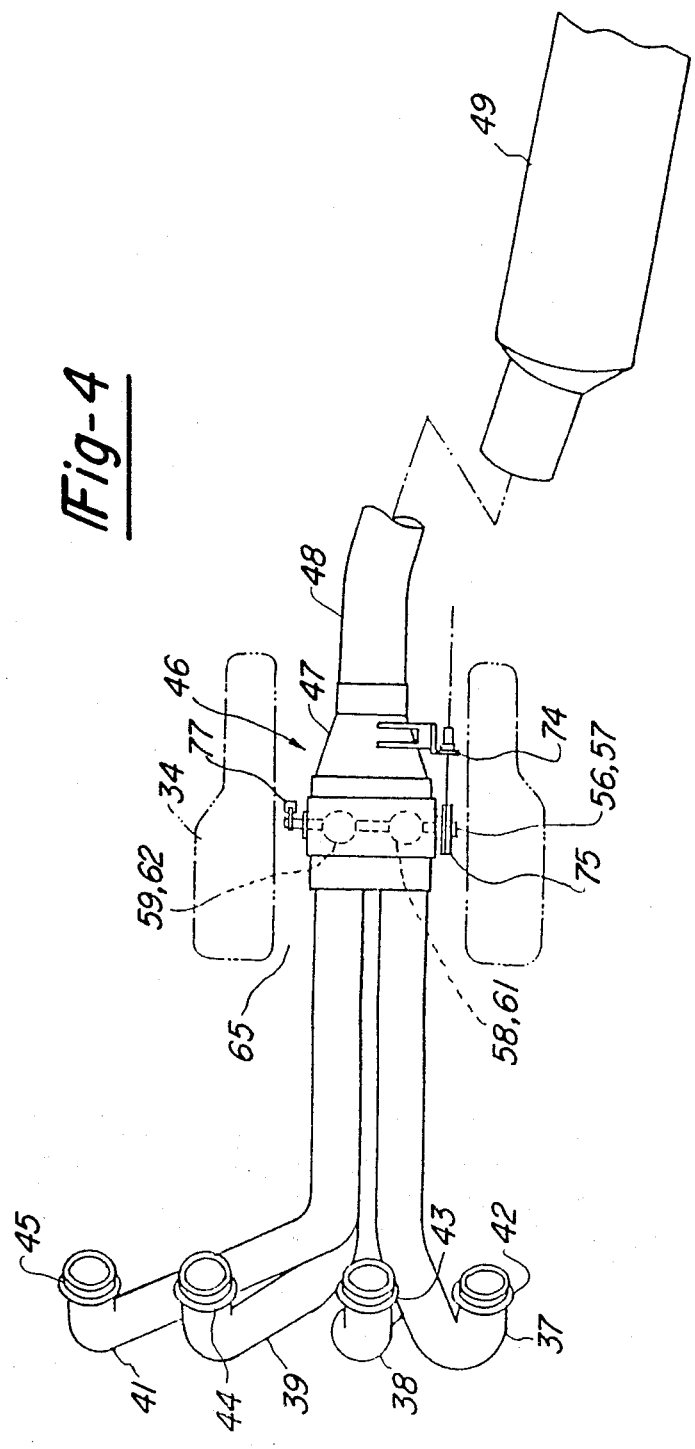
FIG. 4 is a top plan view showing the exhaust system and its relationship to the crankcase transmission assembly of the engine.

It should be noted that the valve assembly 46 lies under the engine 31 and specifically beneath the crankcase housing 34. In order to minimize the loss of ground clearance, the lower wall of the crankcase housing 34 is provided with a longitudinally extending recess 65 through which a part of the valve body 51 extends and also through which a part of the exhaust pipes 37 and 41 extend. As a result, the loss of ground clearance is substantially minimized. In addition, the longitudinal direction of the recess 45 permits air to flow to cool the exhaust system and, specifically, the control valve assembly 46. To aid in this cooling, the body, or cowling, 29 is provided with an air inlet opening 66 that faces forwardly and through which air may flow so as to cool the exhaust system. The heated air exits through an outlet opening 67 formed in the rear portion of the cowling 29 (FIG. 3).

The valve shafts 56 and 57 and, accordingly, the valve elements 58, 59, 61 and 62 are operated so as to be moved between their open and closed position in response to an engine running condition such as load or speed. To this end there is provided an engine condition sensor 68 which outputs a signal corresponding to the engine running condition to a computer control circuit 69. The computer control circuit 69 operates a control motor 71 which, in turn, drives a pulley 72. The pulley 72 has affixed to it a pair of flexible transmitters 73 which have their sheathes maintained in a bracket 74 positioned in proximity to the valve 46. In this embodiment of the invention, a pulley 75 is affixed to the valve shaft 57 and the flexible transmitters 73 are connected to this pulley for rotating the valve shaft 57.

The control circuit also includes an angle sensor 76 that senses the angle of the pulley 72 and, accordingly, the angle of the pulley 75 and feeds back this signal to the computer 69. Generally, the computer 69 functions to maintain the valve plates 58, 59, 61 and 62 in their fully closed position (wherein they obstruct approximately one-half of the flow area in the exhaust system) at mid-range loads and the valve elements are opened at other loads. Of course, the actual running conditions under which the valves are closed and open will vary from engine to engine and those skilled in the art can readily arrive at an arrangement for appropriately controlling a given engine.

The rotation of the valve shaft 57 is transmitted to rotation of the valve shaft 56 so that all of the valve elements, 58, 59, 61 and 62 will be operated in unison. To this end, there is provided a turnbuckle mechanism 77 that interconnects to a pair of levers 78 affixed to the valve shafts 56 and 57 for ensuring their simultaneous rotation. The turnbuckle 77 permits adjustment of the relative angular positions of the valve shafts 56 and 57.

The fact that the shaft 57 is directly operated by the pulley 75 while the shaft 56 is indirectly operated, permits the valve assembly 46 to be raised higher into the recess 65 of the crankcase casing 34 and thus permits a more compact assembly. In other applications, it may be possible to provide pulleys like the pulley 75 on both the shafts 56 and 57 although some of the advantages of the compactness will, obviously, be lost with such an arrangement.

It should also be noted that the fact that the body has a portion which underlies the valve assembly 46. The valve assembly 46 will be protected from foreign objects which may be thrown up during movement of the motorcycle. However, the air flow passage defined by the openings 66 and 67 will ensure good cooling.

Cooling is further assisted and lightning is possible by means of a plurality of lightning holes 79 that extend through the valve body 51. These lightning holes also reduce the effects of thermal expansion.

Figure 7:
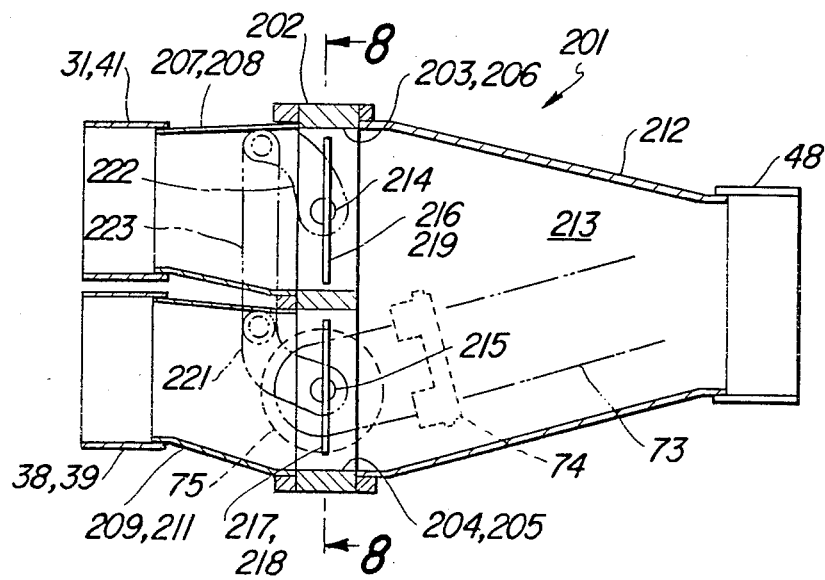
FIG. 7 is an enlarged cross-sectional view, in part, similar to FIG. 5, showing a control valve constructed in accordance with another embodiment of the invention.
Figure 8:
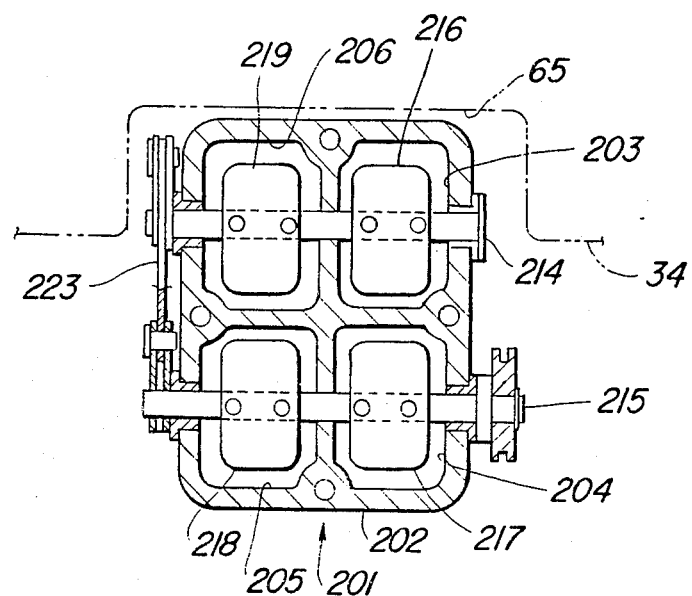
FIG. 8 is a cross-sectional view taken along the line 8—8 of FIG. 7.

FIGS. 7 and 8 show another embodiment of the invention. This embodiment is generally similar to the embodiment of FIGS. 1 through 6. However, in this embodiment the control valve assembly, which is indicated generally by the reference numeral 201 has a slightly different configuration and is formed as a fabrication. The valve element 201 includes a main body portion 202 in which four rectangularly configured openings 203, 204, 205 and 206 are formed. The openings 203 and 206 lie next to each other and above the respective openings 204 and 205. Inlet sections, which may be formed as fabrications 207, 208, are aligned with the openings 203 and 206 and receive the exhaust pipes 37 and 41, respectively. In a like manner, inlet sections 209, 211, extend from the openings 204 and 205 and receive the exhaust pipes 38, 39, respectively.

A fabricated collector section 212 extends from the downstream portion from the main valve body 202 and defines an expansion chamber 213. The tail pipe 48 is received on the end of this collector section.

As with the previously described embodiment, valve shaft 214 and 215 are journaled in the main body portion 202 and extend one above the other. Generally rectangular valve plates 216, 217, 218 and 219 are affixed to the valve shaft 214 and 215 within the openings 203, 204, 205 and 206, respectively, for controlling the flow. In this embodiment, the valve plates 216, 217, 218 and 219 are adapted to fully extend across the openings 203, 204, 205 and 206 when the valves are in their closed position. As may be seen from FIG. 8, however, the cross-sectional area of the valve plates 216, 217, 218 and 219 is substantially less than the area of the openings 203, 204, 205 and 206. The difference in cross-sectional area is approximately one-half so that approximately one-half of the flow area will be obstructed, as with the previously described embodiment, when the valve shafts 214 and 215 are in their fully closed positions.

Like the previously described embodiment, a pulley 75 is affixed to the shaft 215 for operating it. The shaft 214 and 215 are interconnected for simultaneous movement by means of links 221 and 222 that are fixed to the shafts 215 and 214, respectively. The links 221 and 222 are interconnected by means of a pivotal link 223 so that the shafts 215 and 214 will rotate in unison.

A control valve arrangement constructed in accordance with yet another embodiment of the invention is illustrated in FIGS. 9 and 10 and is indicated generally by the reference numeral 251. This control valve differs from the previous control valves in that it only requires one valve shaft. In accordance with this embodiment, a main valve body 252 is provided with a pair of generally oval-shaped sections 253 and 254. The section 253 is aligned with inlet openings 255 and 256, which are generally cylindrical in shape. In a like manner, the opening 254 is aligned with inlet openings 257 and 258 which are cylindrical in configuration. The openings 255, 256, 257 and 258 receive exhaust pipes as in the previously described embodiment.

In this embodiment, a single valve shaft 259 is journaled in the body 252 and extends generally transversely across it. A pair of oval-shaped valve elements 261 and 262 are affixed to the valve shaft 259 and extend into the passages 253 and 254. Rotation of the valve elements 261 and 262 will selectively open and close the flow areas so as to achieve the results as aforedescribed.

Figure 11:
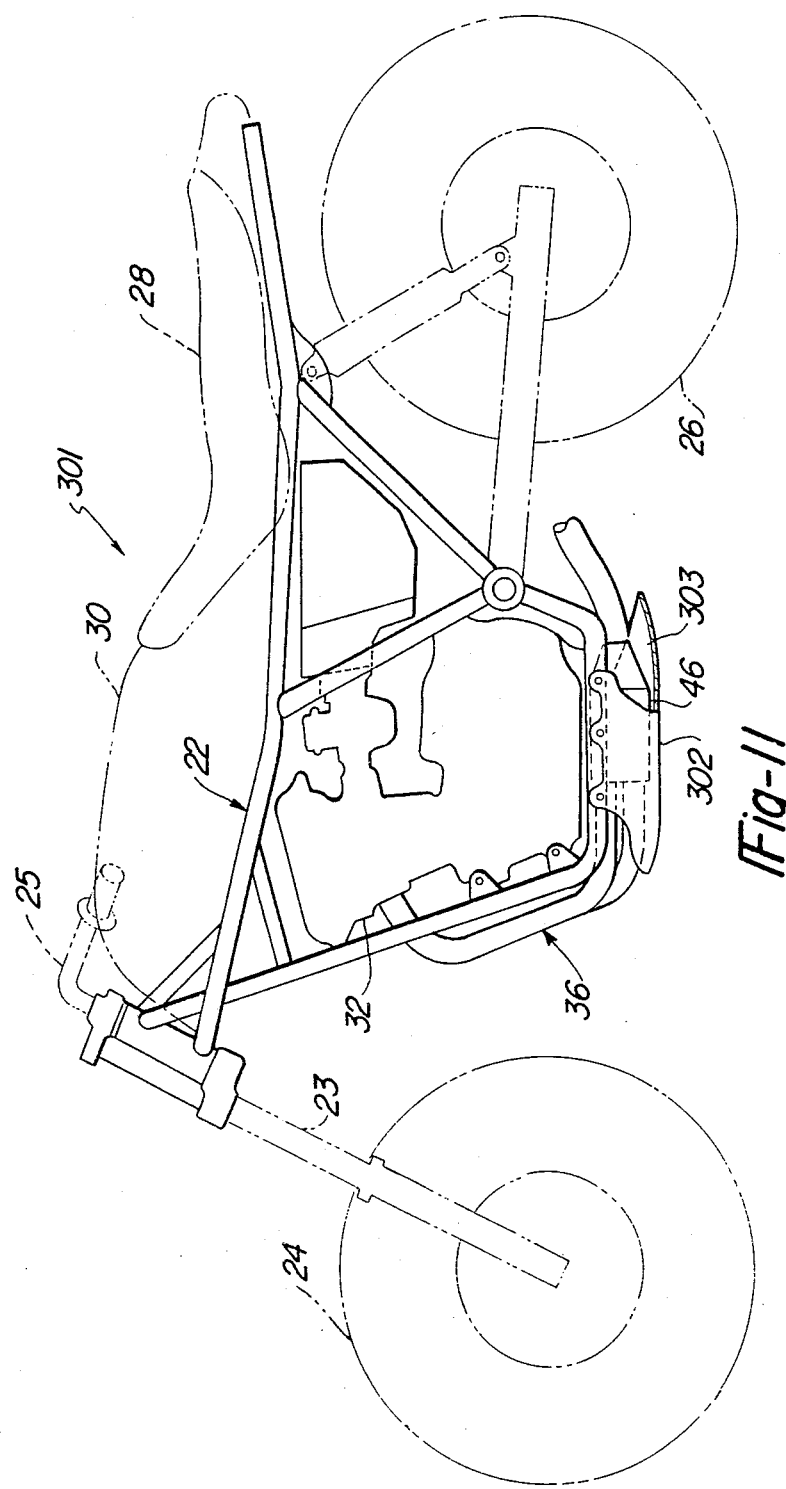
FIG. 11 is a side-elevational view of a motorcycle constructed in accordance with another embodiment of the invention.

In all of the embodiments thus far described, the motorcycle 21 was provided with a cowling, or body portion, 29 that had a portion that extended beneath and protected the valve assembly. FIG. 11 shows an embodiment of a motorcycle, indicted generally by the reference numeral 301, that has a construction the same as the previously described embodiment except that it lacks the cowling 29. For that reason, components of this embodiment which are the same as the previously described embodiment have been identified by the same reference numerals and will not be described again. In this embodiment, however, a shield or skid plate 302 is affixed to the frame 22 beneath the valve element 46 so as to protect it. The skid plate 302 is, however, configured so as to provide an open and front end so as to define a longitudinally extending air passage 303 for cooling. In all other regards, this embodiment is the same as the previously described embodiments and for that reason further description of it is believed to be unnecessary.

It should be readily apparent from the foregoing description, that a number of embodiments of the invention have been illustrated and described. Each of these embodiments incorporates a control valve for controlling the reflective area of the exhaust system so as to improve performance at mid-range conditions. In addition, the arrangements are all designed so that the control valve will not seriously and adversely affect the ground clearance and also so that it will be cooled by a path of cooling air flowing across it. In addition, the control valve is protected by a skid plate or a body portion so as to avoid its damage. In addition to the illustrated and described embodiments, variously changes and modifications may be made without departing from the spirit and scope of the invention, as defined by the appended claims.

I claim:

1. In an internal combustion engine comprised of a crankcase defined of a crankcase housing, a plurality of exhaust ports formed in a side of said engine, a plurality of exhaust pipes extending from said exhaust ports downwardly and passing beneath said crankcase housing, valve means in said exhaust pipes for controlling the flow therethrough, said valve means lying beneath said crankcase housing, and a recess formed in said crankcase housing through which at least a portion of said valve means in said exhaust pipes pass.

2. In an internal combustion engine as set forth in claim 1, wherein the recess extends transversely through the crankcase housing for permitting air to flow therethrough for cooling the exhaust pipes and the valve means.

3. In an internal combustion engine as set forth in claim 1, in combination with a vehicle powered by the internal combustion engine.

4. In an internal combustion engine as set forth in claim 3, wherein the recess extends from the front to the rear of the vehicle.

5. In an internal combustion engine as set forth in claim 4, further including an air inlet opening permitting air to enter the recess and an air outlet opening permitting air to exit the recess during vehicle travel for cooling the valve means and the exhaust pipes.

6. In an internal combustion engine as set forth in claim 5, wherein the vehicle comprises a motorcycle having a single steered front wheel and a rear wheel driven by the engine.

7. In an internal combustion engine as set forth in claim 6, wherein the exhaust ports of the engine extend transversely across the longitudinal center line of the motorcycle.

8. In an internal combustion engine as set forth in claim 7, wherein the crankcase comprises a combined crankcase transmission assembly containing a change speed transmission.

9. In an internal combustion engine as set forth in claim 1, wherein the valve means comprises a single valve body having a plurality of valve elements for controlling the flow through the respective exhaust pipes.

10. In an internal combustion engine as set forth in claim 9, wherein some of the exhaust pipes lie vertically above other of the exhaust pipes.

11. In an internal combustion engine as set forth in claim 10, wherein the valve body supports a pair of horizontally disposed valve shafts to which the valve elements are affixed and further including control means for rotating the lowermost valve shaft and motion transmitting means for transmitting motion from said lowermost valve shaft to the uppermost valve shaft.

12. In an internal combustion engine as set forth in claim 11, wherein the lowermost valve shaft is operated by means of a pulley affixed to an exposed end thereof.

13. In an internal combustion engine as set forth in claim 12, in configuration with a vehicle powered by the engine and wherein the recess extends from the front to the rear of the vehicle.

14. In an internal combustion engine as set forth in claim 13, further including an air inlet opening permitting air to enter the recess and an air outlet opening permitting air to exit the recess during vehicle travel for cooling the valve means and the exhaust pipe.

15. In an internal combustion engine as set forth in claim 14, wherein the vehicle comprises a motorcycle having a single steered front wheel and a rear wheel driven by the engine.

16. In an internal combustion engine as set forth in claim 15, wherein the exhaust ports of the engine extend transversely across the longitudinal center line of the motorcycle.

17. In an internal combustion engine as set forth in claim 16, wherein the crankcase comprises a combined crankcase transmission assembly containing a change speed transmission.

18. In an internal combustion engine as set forth in claim 17, further including a skid plate affixed to the vehicle and underlying the valve means.

19. In an internal combustion engine as set forth in claim 18, wherein the skid plate comprises a portion of the body of the vehicle 20. In an internal combustion engine as set forth in claim 1, further including an expansion chamber downstream of said valve means into which all of the exhaust pipes discharge.

21. In an internal combustion engine as set forth in claim 20, wherein the valve means comprises a single valve body having a plurality of valve elements for controlling the flow through the respective exhaust pipes.

22. In an internal combustion engine as set forth in claim 21, wherein some of the exhaust pipes lie vertically above other of the exhaust pipes.

23. In an internal combustion engine as set forth in claim 22, wherein the valve body supports a pair of horizontally exposed valve shafts to which the valve elements are affixed and further including control means for rotating the lowermost valve shaft and motion transmitting means for transmitting motion from said lowermost valve shaft to the uppermost valve shaft.

24. In an internal combustion engine as set forth in claim 23, wherein the lowermost valve shaft is operated by means of a pulley affixed to an exposed end thereof.

25. In an internal combustion engine as set forth in claim 24, in combination with a vehicle powered by the internal combustion engine.

26. In an internal combustion engine as set forth in claim 25, wherein the vehicle comprises a motorcycle having a single steered front wheel and a rear wheel driven by the engine.

27. In an internal combustion engine as set forth in claim 26, further including a skid plate affixed to the vehicle and underlying the valve means.

28. In an internal combustion engine as set forth in claim 27, wherein the skid plate comprises a portion of the body of the vehicle.

29. A valve member for controlling the effective area of a plurality of exhaust pipes comprising a valve housing defining at least an upper exhaust gas passage and a lower exhaust gas passage, an upper valve shaft rotatably journaled in said valve body and extending through said upper exhaust gas passage, a lower valve shaft journaled in said valve body and extending through said lower exhaust gas passage, valve elements affixed to said valve shafts for controlling the effective area of said exhaust gas passages, an operator affixed to an exposed end of said lowermost valve shaft, and motion transmitting means for transmitting motion from said lowermost valve shaft to said uppermost valve shaft.

30. In a vehicle powered by an internal combustion engine comprised of a crankcase defined by a crankcase housing, a plurality of exhaust ports formed at one side of said engine, a plurality of exhaust pipes extending from said exhaust ports downwardly and passing beneath said crankcase housing, valve means in said exhaust pipes for controlling the flow therethrough, said valve means lying beneath said crankcase housing, and a skid plate affixed to said vehicle and lying beneath said valve plate valve means for protecting said valve means.

* * * * *